United States Patent [19]
Brickell

[11] Patent Number: 5,898,454
[45] Date of Patent: Apr. 27, 1999

[54] PHASE CANCELLATION IN A MULTI-OUTPUT DISTRIBUTION AMPLIFIER AT CROSSOVER FREQUENCY

[75] Inventor: John Willard Brickell, Lawrenceville, Ga.

[73] Assignee: Scientific-Atlanta, Inc., Norcross, Ga.

[*] Notice: This patent issued on a continued prosecution application filed under 37 CFR 1.53(d), and is subject to the twenty year patent term provisions of 35 U.S.C. 154(a)(2).

[21] Appl. No.: 08/657,206

[22] Filed: Jun. 3, 1996

[51] Int. Cl.⁶ .................................................. H04N 7/173
[52] U.S. Cl. .................................................. 348/6; 455/3.1
[58] Field of Search .............................. 455/6.1, 5.1, 4.2, 455/3.1; 348/12, 13, 6; H04N 7/173

[56] References Cited

U.S. PATENT DOCUMENTS

| | | | |
|---|---|---|---|
| 3,566,046 | 2/1971 | McCormick et al. | 455/5.1 |
| 3,806,813 | 4/1974 | Eller | 455/5.1 |
| 3,855,431 | 12/1974 | Stewart | 379/405 |
| 3,889,072 | 6/1975 | Stewart | 379/344 |
| 4,238,766 | 12/1980 | Gargini | 348/13 |
| 4,390,854 | 6/1983 | Colvin | 333/193 |
| 4,982,440 | 1/1991 | Dufresne et al. | 455/4.1 |
| 5,068,630 | 11/1991 | Gris | 333/100 |
| 5,126,702 | 6/1992 | Gris | 455/6.1 |
| 5,204,644 | 4/1993 | Dalisda | 333/127 |
| 5,218,714 | 6/1993 | Ishibashi et al. | 455/6.1 |
| 5,317,392 | 5/1994 | Ishibashi et al. | 348/6 |
| 5,343,158 | 8/1994 | Gris et al. | 455/5.1 |
| 5,519,434 | 5/1996 | Fasquel | 455/6.1 |

*Primary Examiner*—Bryan Tung
*Attorney, Agent, or Firm*—Kenneth M. Massaroni; Hubert J. Barnhardt, III; Kelly A. Gardner

[57] ABSTRACT

A multi-output distribution amplifier includes a forward amplifier and a reverse amplifier and multiple outputs. The forward and reverse paths are separated utilizing low and high pass filters. The geometric mean frequency between the respective pass bands of the high and low pass filters is known as the crossover frequency. A circuit for providing a 180 degree phase reversal such as a balun transformer is connected in series with one (in a dual output arrangement) or half the reverse paths of an arrangement involving three or more forward or reverse paths to improve crossover isolation. For example, in a typical dual output distribution arrangement where the amplifiers are not padded, close to 20 dB of crossover isolation improvement is accomplished by simply connecting a balun transformer in series with one or the other of the low pass filters connected to one or the other forward direction output. At a minimum, a 6 dB improvement can be achieved.

21 Claims, 3 Drawing Sheets

TYPICAL DISTRIBUTION AMPLIFIER CONFIGURATION FOR DUAL OUTPUTS WITH 180° PHASE SHIFT IN ONE OF THE REVERSE PATHS

EXAMPLE DIAGRAM - FREQUENCY BANDS
FIG. 2.
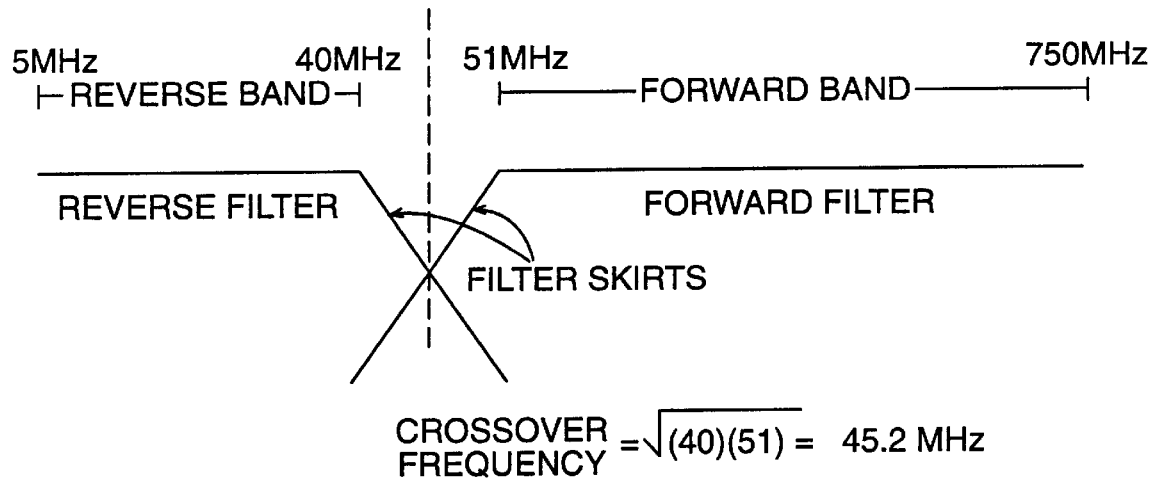
$$\text{CROSSOVER FREQUENCY} = \sqrt{(40)(51)} = 45.2 \text{ MHz}$$
EXAMPLE CONFIGURATION - 180° SHIFTER
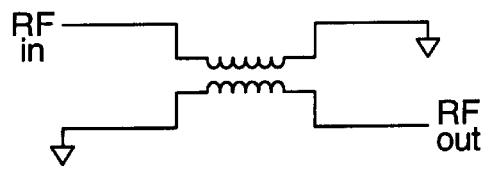
FIG. 3.

PHASE CANCELLATION IN A MULTI-OUTPUT DISTRIBUTION AMPLIFIER AT CROSSOVER FREQUENCY

This invention is related by subject matter to U.S. patent application Ser. No. (Attorney docket no. 1263.56286) entitled "Reconfigurable Node for a Communication Network" of Michael Labiche et al. filed concurrently herewith.

BACKGROUND OF THE INVENTION

A. Technical Field

This invention relates to the field of forward and reverse path distribution amplifiers and, in particular, to improving signal performance at the crossover between forward and reverse path frequency bands using circuitry providing a 180 degree phase reversal.

B. Description of the Relevant Art

With the emphasis recently placed on reverse path capability within, for example, cable television signal distribution systems to provide high speed modem, telecommunications and other reverse path applications, so-called loop gain in the forward and reverse sections of a cable television distribution amplifier has become an issue. Loop gain, that is, gain, within a circuit loop within an amplifier in the forward and reverse path can become a factor and cause amplifier "singing" or undesirable signal oscillations. It is important at the crossover frequency between the forward and reverse pass bands that the loop gain be less than 1. One known method for minimizing the possibility of undesirable oscillation is to filter the forward frequencies within the reverse path and to filter the reverse frequencies within the forward path. This method causes the maximum loop gain to occur at the geometric mean of the forward and reverse frequency bands (the crossover frequency) where rejection is obtained by the skirts of the suggested filters. But minimizing the loop gain at the crossover frequency places severe requirements on the filters which must roll off very rapidly to insure good crossover isolation.

Gris, U.S. Pat. Nos. 5,068,630; 5,126,702 and 5,343,158 has recognized that by providing a transformer device within a circuit having high and low pass paths, phase cancellation can occur. In particular, in Gris '630, a low-pass path through a multiple coupler includes a phase inverter transformer to enable recombination of low-pass and high pass signals without any distortion. Gris '702 shows in FIGS. 3–7 several applications of phase inverters to provide the capability of signals in each of a high- and low-pass path without distortion. Finally, Gris '158 shows the application of a phase inverter TA at column 4, line 15–25, for example, where the two signals are exactly equal, if properly balanced, and after inversion, the two signals are exactly opposite each other and cancel each other out at point 6 of FIG. 1.

While Gris et al. '158 relates to a cable television distribution amplifier, Gris relies on the component values in each leg of paths 7, 5, 6 and 7, 3, 4, 6 to be perfectly balanced and match each other which may be difficult with temperature variations and the like expected in distribution amplifiers which are used outdoors and may experience internal temperatures on the order of 95 degrees Centigrade. Moreover, Gris et al. '158 is concerned with recombining low-pass and high-pass paths at a recombination point and not with crossover compensation in a plurality of loops of a multiple output distribution amplifier. Consequently, while it is known to use phase reversal to advantage for phase cancellation, there remains a problem of improving crossover compensation at crossover frequency in a loop of a distribution amplifier having multiple outputs where the high pass/low pass frequency bands overlap.

SUMMARY OF THE INVENTION

In accordance with the principles of the present invention, a circuit for providing a phase reversal is introduced in series with a filter in the forward or reverse path in one loop of a two or more output distribution amplifier at the forward direction output end of the amplifier. The adverse gain characteristics introduced in the one loop cancel the gain characteristics introduced in the other loop of a two output amplifier. When three or more outputs are provided, according to the principles of the present invention, the phase reversal is introduced into half of the loops. In one embodiment of the present invention, the 180 degree phase reversal is introduced between the branch or split points following either the forward or reverse amplifier and the filters after the split in the forward path of the amplifier or before the recombination point in the reverse path. In another embodiment, the 180 degree phase reversal is introduced in series between a filter and the combination point at the forward direction output end of the amplifier. The circuit for providing the 180 degree phase reversal may be a balun transformer. If the balun transformer introduces direct current resistance into the path, to balance the two loops, a comparable value resistor may be introduced at a similar location in the other loop.

In this manner, there is provided at least a 6 dB improvement in crossover isolation. In a typical two forward direction output amplifier having no padding, the improvement can be 20 dB. In a typical triple output distribution amplifier, the crossover isolation has been determined to be approximately 9 dB. Filter specifications can be relaxed, leading to less change in group delay in the forward and reverse channels closest to the crossover frequency. On the other hand, a change in group delay can corrupt digital data transmitted in the system. Since the channels closest the crossover frequency may be carrying digital data, the improvement in crossover isolation can likewise improve bit error rate of transmitted data through the amplifier.

These and other features of the present invention will be best understood by reading the following detailed description of the drawings.

BRIEF DESCRIPTION OF THE DRAWINGS

FIG. 2 is an exemplary diagram for defining first and second frequency bands for forward and reverse directions and a so-called crossover frequency, the geometric mean frequency, between typical forward and reverse bands, the forward band, in this example, comprising 51 to 750 MHz and the reverse band comprising 5 MHz to 40 MHz and so the crossover frequency being 45.2 MHz.

FIG. 3 is an exemplary schematic of a balun transformer configuration for providing a 180 degree phase shift.

FIG. 4A for a triple output amplifier configuration and FIG. 4B for a dual output configuration.

DETAILED DESCRIPTION OF TIE DRAWINGS

Figure 1:
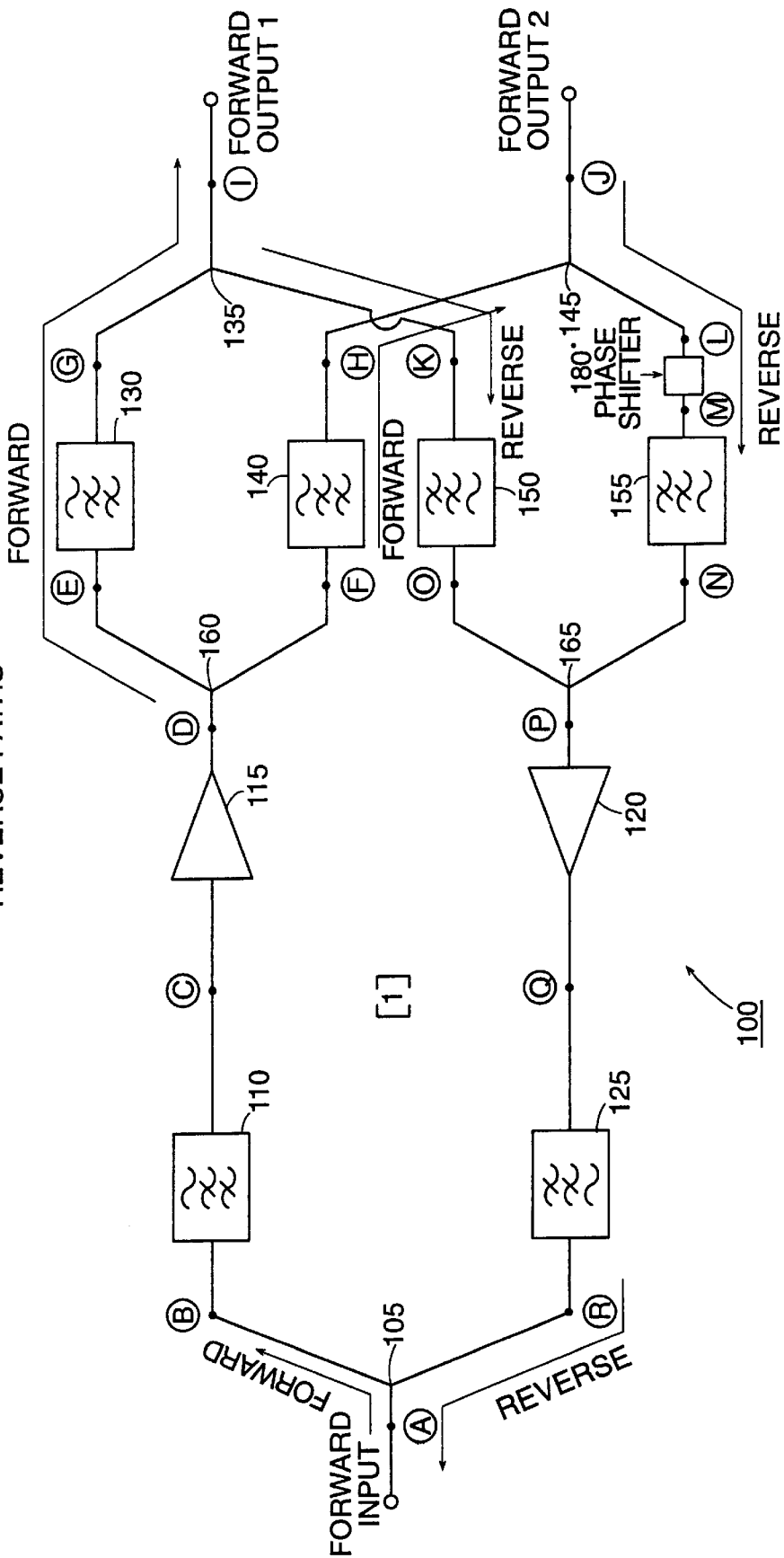
FIG. 1 is a block schematic diagram of a typical two forward direction output cable distribution amplifier having forward and reverse direction amplifiers and two forward direction outputs (two reverse direction inputs).

Referring first to FIG. 1, there is shown a block schematic diagram for a typical dual output cable distribution amplifier. Cable distribution amplifiers are normally used to amplify signals in a forward direction from a cable head end (the left side of FIG. 1) toward the subscribers of a cable television system (the right side of FIG. 1). Recently they have become more commonly used for providing amplification as well in the reverse or upstream path (right to left) from a subscriber to the cable television head end. The forward direction or downstream direction typically involves the transmission of a plurality of frequency division multiplexed television channels and data streams that may be transmitted in the forward direction television channels or out-of-band. For example, referring briefly to FIG. 2 a typical downstream or forward band of cable television channels comprises a frequency band of from 51 to 750 MHz. A typical reverse direction or upstream direction may involve a smaller frequency band of from 5 to 40 MHz. Other frequency bands are known having different splits of frequency bands, some involving two upstream paths, one at a lower end and one at an upper end. The present invention may be applicable in all such arrangements.

The depicted amplifier apparatus of FIG. 1 represents a single forward input and dual forward outputs designated Forward Output 1 and Forward Output 2. Typically in the direction from a headend toward subscribers, there are several branching points such that the signal is distributed in several directions and may branch several times before the signal reaches a particular subscriber. While two forward outputs are shown, so-called triple and even quadruple arrangements are known. These may be used, for example, at a street intersection to permit a television signal to be distributed down each of the several streets at the intersection. A triple arrangement is not shown but would involve yet another Forward Output 3 coupled to points 160 and 165 and typically including forward and reverse path pass band filters similar to those shown to separate the directions of transmission. According to U.S. patent application Ser. No.(attorney docket no. 1263.56286) entitled "Reconfigurable Node for a Communication Network" of Michael Labiche et al. and incorporated herein as to the full extent of its teachings, a replaceable plug-in module may be used to permit a node such as a site for a distribution amplifier to be reconfigurable in the field, for example, a distribution amplifier may be modified from coaxial to fiber media. Consequently, the present invention may be manufactured as a plug-in module to a motherboard or comprise a portion of such a plug-in module or be situated on a motherboard of the amplifier.

For example, the output of forward amplifier 115 is provided at branching point 160 to forward band pass filters 130 and 140 to each of the combination points 135 and 145 at Forward Output 1 and Forward Output 2 respectively. Consequently, two forward paths are provided. A third and even a fourth forward path would be provided for in the same way. In the reverse path, two reverse path filters 150 and 155 pass the respective reverse path signals from Forward Output 1 and Forward Output 2 (the two reverse path inputs) to reverse path amplifier 120 via combination point 165.

Altogether then, one forward path from a headend (not shown) through a cable television distribution amplifier apparatus involves a branching of the signal at point 105, passage through a typically high pass filter, and blockage at a low pass filter 125. So the forward path includes points A, B and C. The forward signal is amplified at amplifier 115 and branches to two outputs Forward Output 1 and Forward Output 2 as already described via forward filter 130 and forward filter 140 respectively.

Similarly, a reverse signal is input at, for example, Forward Input 1. The reverse signal is passed through reverse filter 150 to reverse amplifier 120 which it reaches via combination point 165. The reverse signal that is input at Forward Output 1 is blocked at forward high pass filter 130. After amplifier 120, the reverse signal is passed by low pass reverse filter 125 toward the head end and is blocked by forward high pass filter 110. The other reverse path signal introduced at Forward Output 2 follows a similar route: low pass filter 155, reverse amplifier 120 and low pass filter 125 to point 105.

Other topologies for multi-output distribution amplifiers are known besides the depicted topology. For example, forward amplifiers may be included in the forward path after the split point 160, for example, at points E and/or F or in the reverse path before the split point 165 at points O and/or N, not shown.

Now, in a two forward output distribution apparatus as shown, there are two loops [1] formed which can have realized gain at a crossover frequency between forward and reverse paths. The crossover frequency is defined as the geometric mean between the top of the reverse band and the bottom of the forward band. Referring briefly to FIG. 2, the geometric mean is calculated for the present example as the square root of 40 times 51 or 45.2 MHz. At this frequency, if a net loop gain results, there can be unwanted oscillation of the amplifiers, that is, one amplifier feeds the other amplifier and a so-called "singing" condition can result. One prior way of dealing with the problem of improving crossover isolation is to improve the roll-off characteristic of the several filters in the forward and reverse paths. The sharper the filter skirt, the higher degree of isolation that can occur at the crossover frequency.

According to the principles of the present invention, a phase reversal circuit is introduced into one or the other of the two loops [1]. In the embodiment of FIG. 1, the phase reversal circuit is shown connected in series between reverse filter 155 and signal combination point 145. In actuality, the phase reversal circuit may just as easily be introduced at any of point E, F, G, H, O, K or N at the forward direction output end of the apparatus 100. In this manner, the signal in one loop [1], for example, including reverse filter 150 is 180 degrees out of phase with the signal in the loop [1] including reverse filter 155. As a result of the 180 degree phase shift, the signals in each loop cancel each other, being 180 degrees out of phase with each other and so do not add and thus contribute to gain at the crossover frequency. At a minimum, the introduction of the 180 degree phase reversal causes a 6 dB improvement in crossover isolation. If no padding is used in conjunction with the forward or reverse amplifier, an even greater improvement can be realized. The introduction of the phase reversal then means that the filters need not be as steep in roll-off characteristic or, consequently, as expensive to produce.

The principle of the present invention is extendable to triple output, quadruple output and so on amplifiers. In such a situation, the phase reversal should be applied in half of the associated loops [1]. As will be explained subsequently herein, the phase reversal is preferably applied in the reverse path and may simply comprise a balun transformer.

One preferred embodiment for creating a 180 degree phase reversal is a balun type transformer. One such transformer is shown in FIG. 3 having a grounded primary, whereby an RF signal in the, for example, reverse path, is received at RF in and passed to a grounded secondary and to RF out. Other simple 180 degree phase reversal circuits may come to mind. One may comprise an amplifier circuit having unity gain for application in the forward path having the broader pass band. Another example is a discrete element circuit providing such a 180 degree phase reversal at the crossover frequency. Placement of a balun transformer in the reverse path is preferred due to the narrow and low frequency reverse path because the higher the frequency the more undesirable insertion loss the inductive influence of the balun transformer can create.

The inductive winding portions of the balun transformer may have some direct current resistive capability, that is, a resistive value. It may be preferable if the resistive value of the phase reversal circuit is sufficiently great to balance such resistance by introducing a comparable value resistor at a similar location in the second (or other) loop or loops. According to the example of FIG. 1, the resistor may be included at point O or K to balance the phase reversal circuit connected between L and M.

Figure 4A:
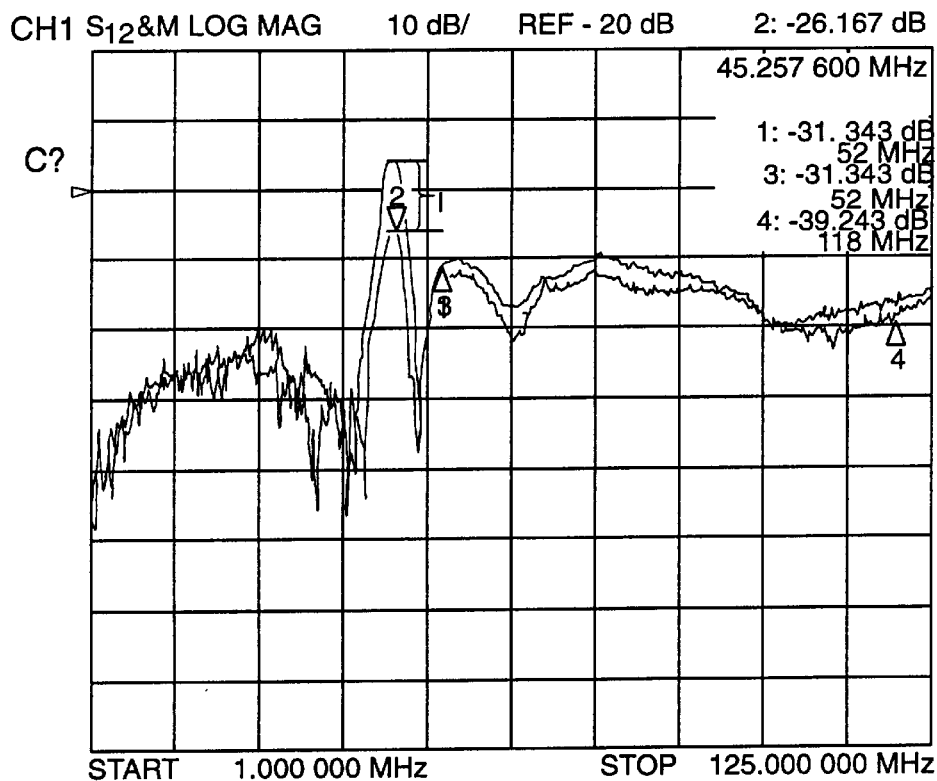
FIG. 4A and 4B show graphs of loss versus frequency showing sample measured improvements in crossover isolation.
Figure 4B:
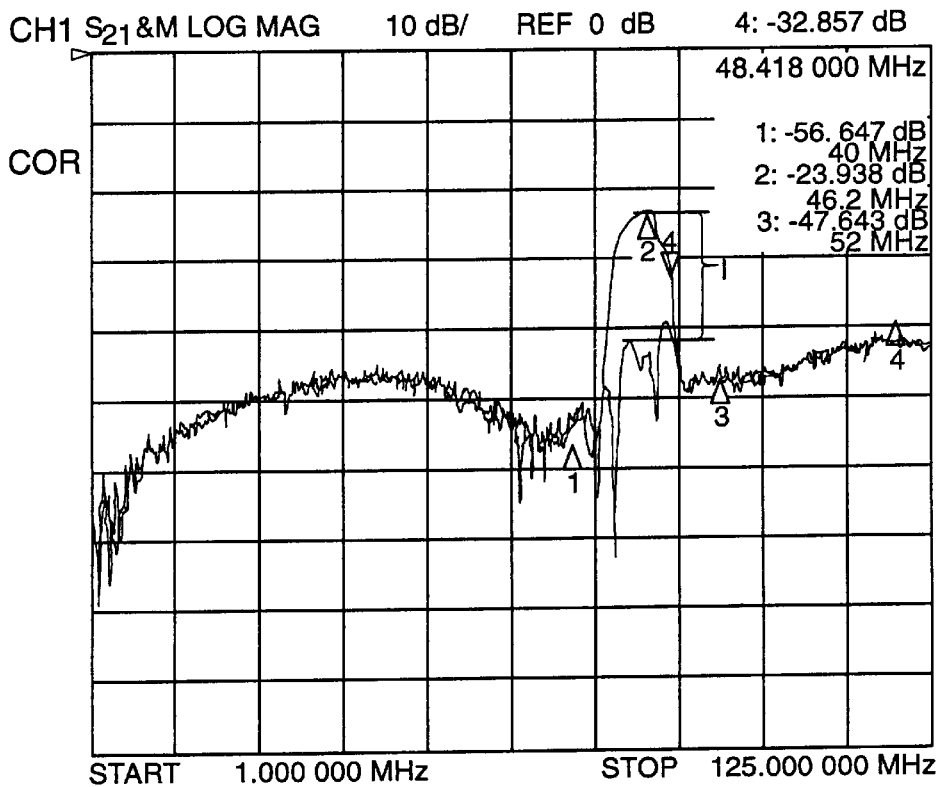

Now referring to FIG. 4A, there is shown a measured loss versus frequency curve for a triple output amplifier. The graph shows a measured frequency sweep of the closed loop gain recorded for a typical triple output amplifier with and without the 180 degree phase reversal circuit of the present invention. In such a triple output amplifier, the improvement I is shown at point 2 (before and after introduction of the phase reversal circuit) at the crossover frequency to be approximately 9 dB with no amplifier padding. Referring to FIG. 4B, a measured loss versus frequency curve of he closed loop gain for a typical dual amplifier is shown where the greatest improvement I was obtained at the crossover frequency. In this situation, the improvement was close to 20 dB (between with and without a 180 degree phase reversal).

Thus, there has been shown and described a method and apparatus for improving crossover isolation in a multi-output distribution amplifier. Any U.S. patents referenced herein should be deemed to be incorporated by reference as to any subject matter believed to be essential to an understanding of the present invention. The present invention may find application in any distribution amplifier system including cable television, telecommunications or combination system involving the transmission of digital or analog signals in accordance with any split configuration between forward and reverse paths including high frequency reverse paths (relative to relatively low frequency forward paths). The present invention should only be deemed to be limited in scope by the claims which follow.

What I claim is:

1. A distribution amplifier having a forward direction input and at least two forward direction outputs and first and second reverse direction inputs and a reverse direction output and having amplifiers in the forward and reverse directions, said distribution amplifier comprising
    a phase reversal circuit for providing a 180 degree phase shift connected in one loop in series with one of a low pass or a high pass filter at the forward direction output end, wherein the phase reversal circuit reduces loop gain in said distribution amplifier.

2. A distribution amplifier as recited in claim 1 wherein said phase reversal circuit is connected in series after said forward direction amplifier and a branching point to a filter.

3. A distribution amplifier as recited in claim 2 wherein said filter comprises a high pass filter.

4. A distribution amplifier as recited in claim 1 wherein said phase reversal circuit is connected in series before said reverse path amplifier and a branching point to said amplifier to a filter.

5. A distribution amplifier as recited in claim 4 wherein said filter comprises a low pass filter.

6. A distribution amplifier as recited in claim 1 wherein said phase reversal circuit is connected between a filter and a combination point for combining forward and reverse directions at a forward direction output.

7. A distribution amplifier as recited in claim 6 wherein said filter comprises a low pass filter.

8. A distribution amplifier as recited in claim 6 wherein said filter comprises a high pass filter.

9. A distribution amplifier as recited in claim 1 wherein said phase reversal circuit comprises a discrete element circuit.

10. A distribution amplifier as recited in claim 1 wherein said phase reversal circuit comprises a transformer.

11. A distribution amplifier as recited in claim 10 wherein said phase reversal circuit comprises a balun transformer.

12. A distribution amplifier as recited in claim 1 wherein said phase reversal circuit comprises an amplifier.

13. A distribution amplifier as recited in claim 1 wherein said phase reversal circuit has a direct current resistance value, said amplifier further comprising a resistor having a direct current resistance value equal to that of said phase reversal circuit in series with a filter at the other forward direction output.

14. A distribution amplifier as recited in claim 13 wherein said resistor is connected between said filter and said forward direction output.

15. A method for improving crossover isolation in a distribution amplifier having amplifiers in forward and reverse directions and having two or more forward direction outputs, the method comprising the step of
    introducing a 180 degree phase shift in series with a filter at one of the forward direction outputs, wherein said introducing step comprises the step of reducing loop gain in said distribution amplifier.

16. A method for improving crossover isolation as recited in claim 15, said distribution amplifier having three or more forward direction outputs and three or more reverse paths wherein said 180 degree phase shift is introduced in half of said reverse paths.

17. A method for improving crossover isolation as recited in claim 15 further comprising the step of introducing a resistor having a resistance value equivalent to that introduced by introducing the 180 degree phase shift, said resistor connected in another of said forward direction outputs.

18. Distribution amplifier apparatus having at least two forward direction outputs and having a forward direction amplifier and a reverse direction amplifier, said apparatus comprising
    first, second and third high pass filters and first, second and third low pass filters, one of said second or third high pass and one of said second or third low pass filter connected to each forward direction output and
    a phase reversal circuit for introducing a 180 degree phase reversal connected in series to one of said second or third high pass or second or third low pass filters connected to each forward direction output, wherein the phase reversal circuit reduces loop gain in said apparatus.

19. Distribution amplifier apparatus according to claim 18 wherein one of two reverse paths include said first and second low pass filters and said phase reversal circuit.

20. Distribution amplifier apparatus according to claim 18 wherein said reverse direction amplifier amplifies signals in a low pass band relative to a band of frequencies amplified by said forward direction amplifier.

21. A distribution amplifier having a forward direction input and at least two forward direction outputs, first and second reverse direction inputs, and a reverse direction output, and further having amplifiers in the forward and reverse directions to form two loops, said distribution amplifier comprising:

a phase reversal circuit for providing a 180 degree phase shift to reduce loop gain in said distribution amplifier, said phase reversal circuit connected in series with one of a low pass filter or a high pass filter in only a single loop of said two loops.

* * * * *